US012744250B2

(12) United States Patent
Badding et al.

(10) Patent No.: US 12,744,250 B2
(45) Date of Patent: Sep. 22, 2026

(54) DEEP-EUTECTIC-SOLVENT-BASED (DES) ELECTROLYTES FOR CATHODE/SOLID ELECTROLYTE INTERFACES IN SOLID-STATE BATTERIES AND METHODS OF MAKING THE SAME

(71) Applicant: CORNING INCORPORATED, Corning, NY (US)

(72) Inventors: Michael Edward Badding, Campbell, NY (US); Zhen Song, Painted Post, NY (US); Jianmeng Su, Shanghai (CN); Tongping Xiu, Shanghai (CN)

(73) Assignee: CORNING INCORPORATED, Corning, NY (US)

( * ) Notice: Subject to any disclaimer, the term of this patent is extended or adjusted under 35 U.S.C. 154(b) by 553 days.

(21) Appl. No.: 18/368,170

(22) Filed: Sep. 14, 2023

(65) Prior Publication Data

US 2024/0097196 A1 Mar. 21, 2024

(30) Foreign Application Priority Data

Sep. 19, 2022 (CN) ......................... 202211137008.3

(51) Int. Cl.
*H01M 10/0569* (2010.01)
*H01M 4/02* (2006.01)
(Continued)

(52) U.S. Cl.
CPC ....... *H01M 10/0569* (2013.01); *H01M 4/382* (2013.01); *H01M 4/505* (2013.01);
(Continued)

(58) Field of Classification Search
CPC . H01M 2300/0028; H01M 2300/0071; H01M 2004/021; H01M 2004/027;
(Continued)

(56) References Cited

U.S. PATENT DOCUMENTS

| | | |
|---|---|---|
| 5,569,560 A | 10/1996 | Olsen et al. |
| 11,276,879 B2 | 3/2022 | Kim et al. |

(Continued)

FOREIGN PATENT DOCUMENTS

| | | | |
|---|---|---|---|
| CN | 106104871 A | * 11/2016 | ........... C01B 32/205 |
| CN | 110994029 A | 4/2020 | |

(Continued)

OTHER PUBLICATIONS

Ugata, "Eutectic Electrolytes Composed of LiN(SO2F)2 and Sulfones for Li-Ion Batterie", J. Phys. Chem. C2022, 126, 10024-10034 (Year: 2022).*

(Continued)

*Primary Examiner* — Matthew J Merkling

(57) ABSTRACT

Batteries include a cathode, an interlayer disposed on the cathode, a solid-state electrolyte disposed on the interlayer, and a lithium anode disposed on the solid-state electrolyte. The interlayer includes a deep-eutectic-solvent-based electrolyte including a lithium salt and a sulfone compound. Methods of forming a battery comprising disposing a deep-eutectic-solvent-based electrolyte comprising a lithium salt and a sulfone compound on a first major surface of a cathode. Methods further comprising disposing a solid-state electrolyte over the first major surface of the cathode. The deep-eutectic-solvent-based electrolyte is positioned between the cathode and the solid-state electrolyte.

20 Claims, 4 Drawing Sheets

(51) Int. Cl.

| | |
|---|---|
| ***H01M 4/38*** | (2006.01) |
| ***H01M 4/505*** | (2010.01) |
| ***H01M 4/525*** | (2010.01) |
| ***H01M 10/0562*** | (2010.01) |
| ***H01M 10/0568*** | (2010.01) |
| ***H01M 10/0585*** | (2010.01) |

(52) U.S. Cl.

CPC ....... *H01M 4/525* (2013.01); *H01M 10/0562* (2013.01); *H01M 10/0568* (2013.01); *H01M 10/0585* (2013.01); *H01M 2004/021* (2013.01); *H01M 2004/027* (2013.01); *H01M 2004/028* (2013.01); *H01M 2300/0028* (2013.01); *H01M 2300/0071* (2013.01)

(58) Field of Classification Search

CPC ........... H01M 2004/028; H01M 4/382; H01M 4/505; H01M 4/525; H01M 10/0569; H01M 10/0562; H01M 10/0568; H01M 10/0585

See application file for complete search history.

(56) References Cited

U.S. PATENT DOCUMENTS

| | | | | |
|---|---|---|---|---|
| 2014/0011101 | A1* | 1/2014 | Ma | H01M 12/06 429/405 |
| 2016/0359199 | A1 | 12/2016 | Galiano et al. | |
| 2017/0338522 | A1 | 11/2017 | Hu et al. | |
| 2020/0067128 | A1 | 2/2020 | Chmiola et al. | |
| 2020/0194832 | A1 | 6/2020 | Park et al. | |
| 2020/0395584 | A1* | 12/2020 | Gardner | H01M 4/48 |
| 2021/0066754 | A1 | 3/2021 | Kim et al. | |
| 2021/0313583 | A1 | 10/2021 | Wang | |
| 2021/0399338 | A1 | 12/2021 | Arnold et al. | |
| 2024/0097196 | A1* | 3/2024 | Badding | H01M 10/052 |

FOREIGN PATENT DOCUMENTS

| | | | | |
|---|---|---|---|---|
| CN | 113039671 A | | 6/2021 | |
| DE | 102014206829 A1 | * | 10/2015 | H01M 10/0562 |
| JP | 2008-291224 A | | 12/2008 | |
| KR | 10-2016-0070025 A | | 6/2016 | |

OTHER PUBLICATIONS

Machine Translation of DE-102014206829-A1 (May 5, 2026) (Year: 2026).*

Machine Translation of CN-106104871-A (May 5, 2026) (Year: 2026).*

Alvarado et al., "A carbonate-free, sulfone-based electrolyte for high-voltage Li-ion batteries", Materials Today, vol. 21, 2018, pp. 341-353.

Dinh et al., "Deep eutectic solvent based on lithium bis[(trifluoromethyl)sulfonyl] imide (LiTFSI) and 2,2,2-trifluoroacetamide (TFA) as a promising electrolyte for a high voltage lithium-ion battery with a LiMn204 Cathode", ACS Omega, 2020, vol. 5, pp. 23843-23853.

Liu J, et al., "The Interface between Li6. 5La3Zr1. 5Ta0. 5O12 and Liquid Electrolyte[J]", Joule, 2020, vol. 4, No. 1, pp. 101-108.

Naguib M, et al., "Interfacial Reactions and Performance of Li7La3Zr2O12-Stabilized Li-Sulfur Hybrid Cell", ACS Applied Materials & Interfaces, 2019, vol. 11, No. 45, pp. 42042-42048.

Nakanishi et al., "Sulfolane-based highly concentrated electrolytes of lithium bis(trifluoromethanesulfonyl)amide: Ionic transport, Li-ion coordination , and Li-S battery performance", J. Phys. Chem. C, 2019, vol. 123, pp. 14229-14238.

Ren et al., "Localized high-concentration sulfone electrolytes for high-efficiency lithium-metal batteries", Chem, vol. 4, 2018, pp. 1877-1892.

Xu et al., "Stabilization of garnet/liquid electrolyte interface using superbase additives for hybrid Li batteries", ACS Appl. Mater. Interfaces, 2017, vol. 9, pp. 21077-21082.

* cited by examiner 112
108
901
105
107
805
104

DEEP-EUTECTIC-SOLVENT-BASED (DES) ELECTROLYTES FOR CATHODE/SOLID ELECTROLYTE INTERFACES IN SOLID-STATE BATTERIES AND METHODS OF MAKING THE SAME

CROSS-REFERENCE TO RELATED APPLICATIONS

This application claims the benefit of priority under 35 U.S.C. § 119 of Chinese Patent Application Serial No. 202211137008.3 filed on Sep. 19, 2022 the content of which is relied upon and incorporated herein by reference in its entirety.

FIELD

The present disclosure relates to deep eutectic solvent-based (DES) electrolytes for cathode/solid-state electrolytes and methods of making the same, and more particularly DES-based electrolytes comprising a lithium salt in solid-state batteries and methods of making the same.

BACKGROUND

Solid-state batteries (SSBs) (e.g., SS lithium (Li) metal batteries based on inorganic solid-state electrolytes (SSEs) (such as garnet-type SSE)) have attracted much attention due to their high safety, improved energy density, high ionic conductivity, and stability against Li metal.

However, conventional Li-metal batteries often suffer from high interfacial resistance between the cathode and solid-state electrolyte. Due to the rigid nature of the ceramic SSE, contact between active particles and the SSE is a "point-surface" contact, which leads to a limited contact area at the cathode-SSE interface and poor Li-ion ($Li^+$) accessibility inside the cathode.

To address these problematic issues, proposed solutions include employing a low melting compound (e.g., $Li_3BO_3$ (LBO), $Li_{2.3-x}Co_{0.7+x}B_{0.3-x}O_3$ (LCBO), etc.) as a bonding material and Li-ion conductor to lower the cathode/SSE interfacial resistance. Additionally, a Li-ion conductive polymer-lithium salt in a polymer matrix ($Li(CF_3SO_2)_2N$ (LiTFSI) in poly(vinylidene fluoride) (PVDF), polyethylene oxide (PEO), poly(ethylene glycol) methyl ether acrylate (CPMEA), etc.) may be used to cushion the poor contact at the cathode/SSE interface. However, the above-proposed configurations all exhibit low Li-ion conductivity, large impedance, and low current density at battery operating conditions. Consequently, there is a need to address these issues.

SUMMARY

The present disclosure provides batteries and methods of making the same comprising a deep-eutectic-solvent-based electrolyte (DES) between (e.g., at an interface) a cathode and a solid-state electrolyte. Providing the DES-based electrolyte can decrease an interfacial resistance between the cathode and a solid-state electrolyte. Providing a liquid electrolyte between the cathode and the solid-state electrolyte (e.g., wetting the cathode/SSE interface) can provide continuous and uniform ion paths at the interface and inside the cathode, for example, due to the high ionic conductivity of the liquid electrolyte and the ability of the liquid electrolyte to conform to the first major surface of the cathode and/or a surface of the solid-state electrolyte. Compared to ionic liquid electrolytes, DES-based electrolytes provide a lower-cost alternative that can be better suited for large-scale applications.

The DES-based electrolyte comprises a lithium salt and a sulfone compound. Providing a concentration of the lithium salt from about 0.5 M to about 5 M (e.g., from 1 M to about 3 M) can enable good ionic conductivity of the DES-based electrolyte. Providing the ratio of the volume of the DES-based electrolyte to the area of the first major surface of the cathode from about 1 μL/cm2 to about 50 μL/cm$^2$ (e.g., from about 5 μL/cm$^2$ to about 20 μL/cm$^2$) can be sufficient to wet the interface between the cathode and the solid-state electrolyte while minimizing concerns associated with traditional liquid electrolytes (e.g., in liquid-based batteries or in hybrid liquid-solid batteries). As demonstrated in the Examples discussed below, the DES-based electrolytes of the present disclosure can unexpectedly enable reduced interfacial resistance (as-formed and after cycling—e.g., 15 Ωcm$^2$ or less at room temperature after 40 cycles) and/or increased capacity retention (e.g., about 90% or more after 40 cycles, about 80% or more after 100 cycles). Maintaining a low (e.g., about 15 Ωcm$^2$ or less, about 12 Ωcm$^2$ or less, or about 10 Ωcm$^2$ or less) interfacial resistance can enable the solid-state battery to have a longer life (e.g., withstand more cycles without failure), reduce losses and heating from increased interfacial resistance, and/or reduce the formation of dendrites (e.g., lithium dendrites) that can lead to failure of the solid-state battery. Maintaining a high capacity retention (e.g., 90% or more after 40 cycles or more, 80% or more after 100 cycles or more) can enable the solid-state battery to be functional for an intended use for a longer period of time than would otherwise be possible.

Providing a solid-state electrolyte can address common safety concerns, for example, leakage, poor chemical stability, and flammability often seen in batteries employing liquid electrolytes. Moreover, providing a solid-state electrolyte can also suppress polysulfide shuttling from the cathode to the anode, thereby leading to improved cathode utilization and a high discharge capacity and energy density. Providing a solid-state electrolyte can reduce a formation of dendrites (e.g., lithium dendrites) that can otherwise result in failure of the battery. Providing a closed pore structure of the solid-state electrolyte can prevent the DES-based electrolyte from traveling beyond the solid-state electrolyte and reduce the formation of dendrites (e.g., lithium dendrites), which can increase a capacity retention of the solid-state battery and/or decrease an interfacial resistance after cycling. Providing a low (e.g., 2% or less, 1.5% or less, 1% or less) porosity at the second major surface of the solid-state electrolyte can reduce an amount of the DES-based electrolyte that can travel away from the interface between the cathode and the solid-state electrolyte, which can increase a capacity retention of the solid-state battery and/or decrease an interfacial resistance after cycling.

Providing a closed pore structure of the cathode can prevent the DES-based electrolyte from traveling beyond the cathode, which can increase a capacity retention of the solid-state battery and/or decrease an interfacial resistance after cycling. Providing a low (e.g., 2% or less, 1.5% or less, 10% or less) porosity at the first major surface of the cathode can reduce an amount of the DES-based electrolyte that can travel away from the interface between the cathode and the solid-state electrolyte, which can increase a capacity retention of the solid-state battery and/or decrease an interfacial resistance after cycling. Providing an electrically conductive spacer (e.g., comprising a foam, for example, Ni foam) can help maintain contact between adjacent components of the solid-state battery and/or control an amount of stress that the components of the solid-state battery are subjected to.

Some example aspects of the disclosure are described below with the understanding that any of the features of the various aspects may be used alone or in combination with one another.

Aspect 1. A battery, comprising:

a cathode;

an interlayer disposed on a first major surface of the cathode, the interlayer comprising a deep-eutectic-solvent-based electrolyte comprising a lithium salt and a sulfone compound;

a solid-state electrolyte disposed on the interlayer; and a lithium anode disposed on the solid-state electrolyte.

Aspect 2. The battery of aspect 1, wherein the lithium salt comprises lithium bis(trifluoromethanesulfonyl)imide (LiTFSI), lithium bis(fluorosulfonyl)imide (LiFSI), lithium perchlorate ($LiClO_4$), lithium tetrafluoroborate ($LiBF_4$), lithium triflate ($LiSO_3CF_3$), $LiC(SO_2CF_3)_3$, or combinations thereof.

Aspect 3. The battery of any one of aspects 1-2, wherein the sulfone compound comprises sulfolane, 3-methylsulfolane, dimethyl sulfone, ethyl methyl sulfone, or combinations thereof.

Aspect 4. The battery of any one of aspects 1-3, wherein a concentration of the lithium salt in the sulfone compound is from 0.5 molar to 5 molar.

Aspect 5. The battery of aspect 4, wherein the concentration of the lithium salt in the sulfone compound is from 1 molar to 3 molar.

Aspect 6. The battery of any one of aspects 1-5, wherein the deep-eutectic-solvent-based electrolyte comprises sulfolane and one or both of lithium bis(fluorosulfonyl)imide (LiFSI) or lithium perchlorate ($LiClO_4$).

Aspect 7. The battery of any one of aspects 1-6, wherein a ratio of a volume of the deep-eutectic-solvent-based electrolyte to an area of the first major surface of the cathode from about 1 $\mu L/cm^2$ to about 50 $\mu L/cm^2$.

Aspect 8. The battery of aspect 7, wherein the ratio of the volume of the deep-eutectic-solvent-based electrolyte to the area of the first major surface of the cathode is from about 5 $\mu L/cm^2$ to about 20 $\mu L/cm^2$.

Aspect 9. The battery of any one of aspects 1-8, wherein the cathode comprises a porosity of 2% or less or a closed pore structure.

Aspect 10. The battery of any one of aspects 1-9, wherein the solid-state electrolyte comprises a porosity of 2% or less or a closed pore structure.

Aspect 11. The battery of any one of aspects 1-10, wherein the cathode comprises lithium cobaltite (LCO), lithium manganite spinel (LMO), lithium nickel cobalt aluminate (NCA), lithium nickel manganese cobalt oxide (NCM) ($LiNi_dCo_eMn_{1-d-e}O_2$, where $0<d<1$, $0<e<1$), lithium iron phosphate ($LiFePO_4$) (LFP), lithium cobalt phosphate (LCP), lithium titanate, lithium niobium tungstate, lithium nickel manganate, and lithium titanium sulfide ($LiTiS_2$), or combinations thereof.

Aspect 12. The battery of any one of aspects 1-11, wherein the solid-state electrolyte comprises lithium, lanthanum, zirconium, and oxygen.

Aspect 13. The battery of aspect 12, wherein the solid-state electrolyte comprises at least one of:

(i) $Li_{7-3a}La_3Zr_2L_aO_{12}$, with L=Al, Ga, or Fe and $0<a<0.33$;

(ii) $Li_7La_{3-b}Zr_2MbO_{12}$, with M=Bi or Y and $0<b<1$;

(iii) $Li_{7-c}La_3(Zr_{2-c},N_c)O_{12}$, with N=In, Si, Ge, Sn, V, W, Te, Nb, or Ta and $0<c<1$;

(iv) protonated LLZO (e.g., $H_xLi_{6.5-x}La_3Zr_{1.5}I_{0.5}O_{12}$, with I=In, Si, Ge, Sn, V, W, Te, Nb, or Ta and $0<x<4$ or $H_xLi_{6.25-x}E_{0.25}La_3Zr_2O_{12}$, with E=Al, Ga, or Fe and $0<x<4$); or combinations thereof.

Aspect 14. The battery of any one of aspects 1-13, wherein the battery has an interfacial resistance between the cathode and the solid-state electrolyte of about 15 $\Omega cm^2$ or less at room temperature after 10 cycles.

Aspect 15. The battery of any one of aspects 1-13, wherein the battery has an interfacial resistance between the cathode and the solid-state electrolyte of about 15 $\Omega cm^2$ or less at room temperature after 40 cycles.

Aspect 16. The battery of any one of aspects 1-15, wherein the battery comprises a capacity retention of about 90% or more after 40 cycles.

Aspect 17. The battery of any one of aspects 1-15, wherein the battery comprises a capacity retention of about 80% or more after 100 cycles.

Aspect 18. A method of forming a battery comprising:

disposing a deep-eutectic-solvent-based electrolyte comprising a lithium salt and a sulfone compound on a first major surface of a cathode; and disposing a solid-state electrolyte over the first major surface of the cathode, the deep-eutectic-solvent-based electrolyte positioned between the cathode and the solid-state electrolyte.

Aspect 19. A method of forming a battery comprising:

disposing a deep-eutectic-solvent-based electrolyte comprising a lithium salt and a sulfone compound on a second major surface of a solid-state electrolyte; and disposing a cathode over the second major surface of the solid-state electrolyte, the deep-eutectic-solvent-based electrolyte positioned between the cathode and the solid-state electrolyte.

Aspect 20. The method of any one of aspects 18-19, further comprising disposing an anode on the solid-state electrolyte, the solid-state electrolyte positioned between the cathode and the anode.

Aspects 21. The method of any one of aspects 18-20, wherein a concentration of the lithium salt in the sulfone compound is from 0.5 molar to 5 molar.

Aspect 22. The method of any one of aspects 18-21, wherein a ratio of a volume of the deep-eutectic-solvent-based electrolyte to an area of the first major surface of the cathode from about 1 $\mu L/cm^2$ to about 50 $\mu L/cm^2$.

Aspect 23. The method of any one of aspects 18-22, wherein the deep-eutectic-solvent-based electrolyte comprises sulfolane and one or both of lithium bis(fluorosulfonyl)imide (LiFSI) or lithium perchlorate ($LiClO_4$).

Aspect 24. The method of any one of aspects 18-22, wherein the lithium salt comprises lithium bis(trifluoromethanesulfonyl)imide (LiTFSI), lithium bis(fluorosulfonyl)imide (LiFSI), lithium perchlorate ($LiClO_4$), lithium tetrafluoroborate ($LiBF_4$), lithium triflate ($LiSO_3CF_3$), $LiC(SO_2CF_3)_3$, or combinations thereof.

Aspect 25. The method of any one of aspects 18-22, wherein the sulfone compound comprises sulfolane, 3-methylsulfolane, dimethyl sulfone, ethyl methyl sulfone, or combinations thereof.

Aspect 26. The method of aspect 21, wherein the concentration of the lithium salt in the sulfone compound is from 1 molar to 3 molar.

Aspect 27. The method of aspect 22, wherein the ratio of the volume of the deep-eutectic-solvent-based electrolyte to the area of the first major surface of the cathode is from about 5 $\mu L/cm^2$ to about 20 $\mu L/cm^2$.

Aspect 28. The method of any one of aspects 18-27, wherein the cathode comprises a porosity of 2% or less or a closed pore structure.

Aspect 29. The method of any one of aspects 18-28, wherein the solid-state electrolyte comprises a porosity of 2% or less or a closed pore structure.

Aspect 30. The method of any one of aspects 18-29, wherein the cathode comprises lithium cobaltite (LCO), lithium manganite spinel (LMO), lithium nickel cobalt aluminate (NCA), lithium nickel manganese cobalt oxide (NCM) ($LiNi_dCo_eMn_{1-d-e}O_2$, where 0<d<1, 0<e<1), lithium iron phosphate ($LiFePO_4$) (LFP), lithium cobalt phosphate (LCP), lithium titanate, lithium niobium tungstate, lithium nickel manganate, and lithium titanium sulfide ($LiTiS_2$), or combinations thereof.

Aspect 31. The method of any one of aspects 18-30, wherein the solid-state electrolyte comprises lithium, lanthanum, zirconium, and oxygen.

Aspect 32. The method of aspect 31, wherein the solid-state electrolyte comprises at least one of:

(i) $Li_{7-3a}La_3Zr_2L_aO_{12}$, with L=Al, Ga, or Fe and 0<a<0.33;

(ii) $Li_7La_{3-b}Zr_2MbO_{12}$, with M=Bi or Y and 0<b<1;

(iii) $Li_{7-c}La_3(Zr_{2-c},N_c)O_{12}$, with N=In, Si, Ge, Sn, V, W, Te, Nb, or Ta and 0<c<1;

(iv) protonated LLZO (e.g., $H_xLi_{6.5-x}La_3Zr_{1.5}I_{0.5}O_{12}$, with I=In, Si, Ge, Sn, V, W, Te, Nb, or Ta and 0<x<4 or $H_xLi_{6.25-x}E_{0.25}La_3Zr_2O_{12}$, with E=Al, Ga, or Fe and 0<x<4); or combinations thereof.

Aspect 33. The method of any one of aspects 18-32, wherein the battery has an interfacial resistance between the cathode and the solid-state electrolyte of about 15 $\Omega cm^2$ or less at room temperature after 10 cycles.

Aspect 34. The method of any one of aspects 18-32, wherein the battery has an interfacial resistance between the cathode and the solid-state electrolyte of about 15 $\Omega cm^2$ or less at room temperature after 40 cycles.

Aspect 35. The method of any one of aspects 18-34, wherein the battery comprises a capacity retention of about 90% or more after 40 cycles.

Aspect 36. The method of any one of aspects 18-34, wherein the battery comprises a capacity retention of about 80% or more after 100 cycles.

BRIEF DESCRIPTION OF THE DRAWINGS

The above and other features and advantages of aspects of the present disclosure are better understood when the following detailed description is read with reference to the accompanying drawings, in which.

Figure 1:
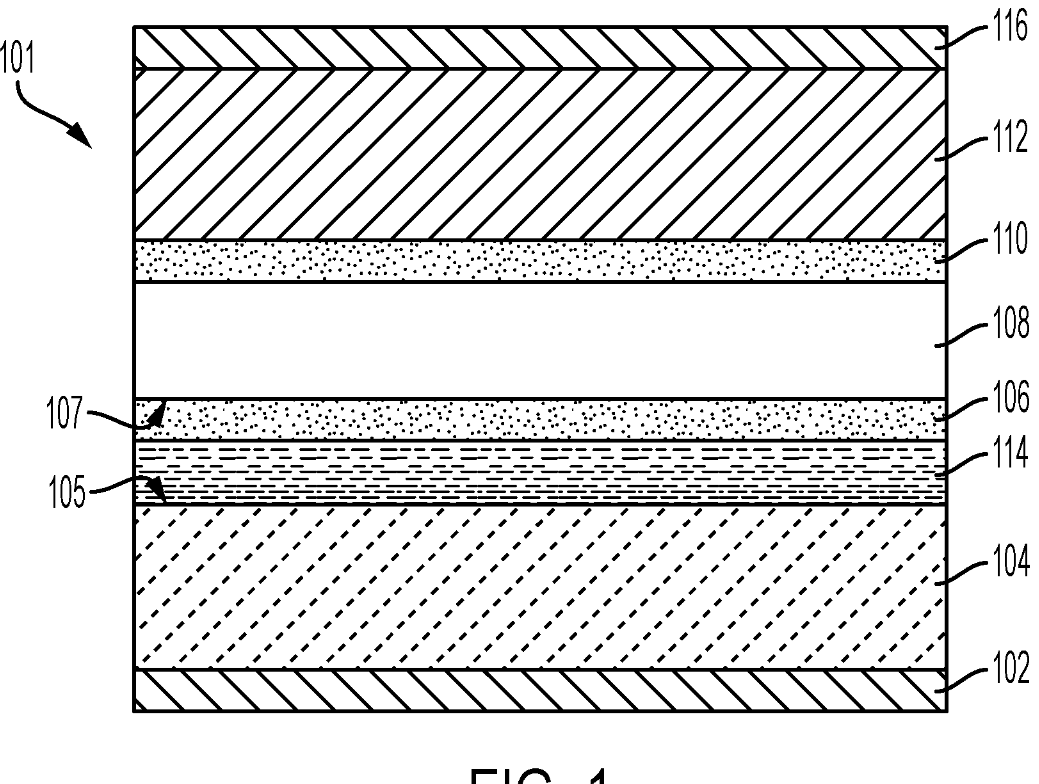
FIG. 1 schematically illustrates a general structure of a solid-state battery in accordance with aspects of the disclosure.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

DETAILED DESCRIPTION

Aspects will now be described more fully hereinafter with reference to the accompanying drawings in which example aspects are shown. Whenever possible, the same reference numerals are used throughout the drawings to refer to the same or like parts.

Figure 2:
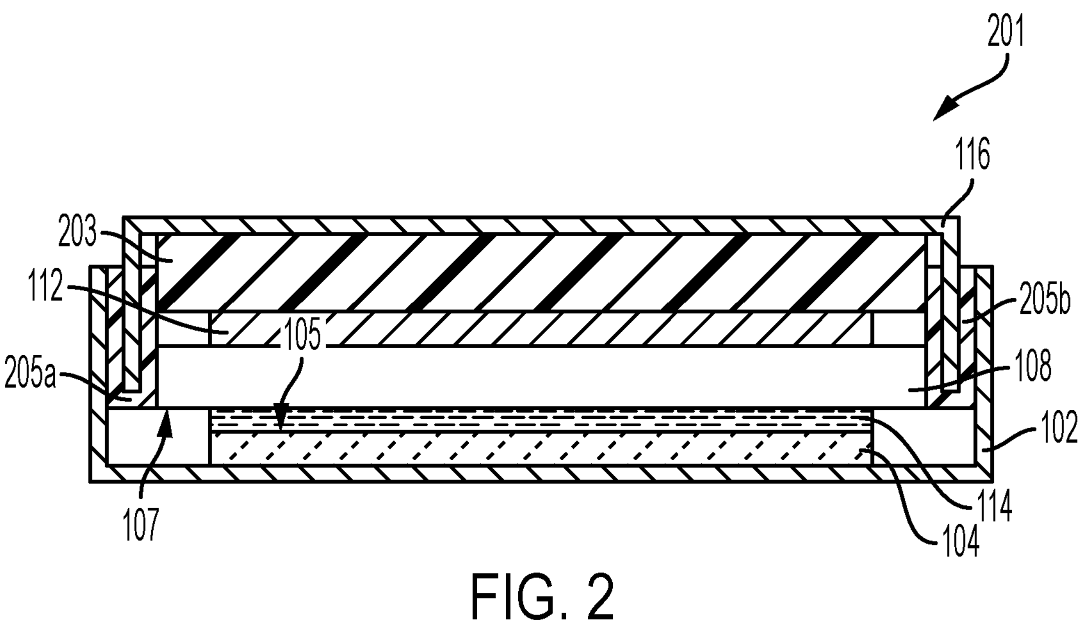
FIG. 2 illustrates a solid-state battery with DES-based electrolyte at the cathode/solid-state electrolyte interface.

FIGS. 1-2 illustrate views of a solid-state battery 101 or 201 comprising a eutectic solvent-based (DES) electrolyte (e.g., interlayer 114) between a cathode 104 and a solid-state electrolyte 108 (e.g., the cathode/solid-state electrolyte interface) in accordance with aspects of the disclosure. The DES-based electrolyte comprises a lithium salt and a sulfone compound. Unless otherwise noted, a discussion of features of aspects of one solid-state battery can apply equally to corresponding features of any aspects of the disclosure. For example, identical part numbers throughout the disclosure can indicate that, in some aspects, the identified features are identical to one another and that the discussion of the identified feature of one aspect, unless otherwise noted, can apply equally to the identified feature of any of the other aspects of the disclosure.

FIG. 1 schematically illustrates a general structure of a solid-state battery 101, and FIG. 2 illustrates a simplified solid-state battery 201 in a coin-cell form. As shown in FIG. 1, the solid-state battery 101 can include, sequentially, a first current collector 102 (e.g., substrate), a cathode 104 disposed on the first current collector 102, an interlayer 114 disposed on the cathode 104, an optional first coating 106, a solid-state electrolyte 108, an optional second interlayer and/or second coating 110, an anode 112, and a second current collector 116 disposed on the anode 112. As shown in FIG. 1, the solid-state battery 101 can optionally comprise a first coating 106 disposed on the cathode 104. The components of the solid-state battery 101 can be disposed horizontally in relation to each other or vertically.

The first current collector 102 comprises an electrically conductive material. As used herein, electrically conductive materials have an electronic conductivity of 100 Siemens per meter (S/m) measured at 20° C. in accordance with ASTME1004-17. In aspects, the first current collector can comprise nickel (Ni) foam, carbon fiber, or a solid metal contact (e.g., aluminum, stainless steel, copper, platinum, nickel, gold, zinc, cobalt, nickel, ruthenium, lithium, lead, titanium, nichrome, etc.). In aspects, the first current collector 102 can be a mechanically stable and/or dimensionally stable substrate that supports the other elements of the solid-state battery 101 or 201. In aspects, the first current collector 102 can comprise the same material as the cathode 104 (discussed below) such that the first current collector 102 is part of the cathode 104.

The cathode 104 comprises an electrically conductive material. In aspects, the cathode 104 can be configured to release and reincorporate a cation (e.g., alkali metal—lithium or sodium, alkali earth metal—magnesium or calcium). In aspects, the cathode 104 can comprise at least one of an alkali metal (e.g., lithium, sodium) or an alkaline earth metal (e.g., magnesium, calcium). In aspects, the cathode 104 can comprise a fluoride compound. In further aspects, the cathode 104 can comprise at least one transition metal, for example, cobalt, manganese, nickel, niobium, tantalum, vanadium, titanium, copper, chromium, tungsten, molybdenum, tin, germanium, antimony, bismuth, iron, or combinations thereof. In aspects, the cathode 104 can comprise a lithium-based electrode, for example lithium cobaltite (LCO), lithium manganite spinel (LMO), lithium nickel cobalt aluminate (NCA), lithium nickel manganese cobalt oxide (NCM) ($LiNi_dCo_eMn_{1-d-e}O_2$, where 0<d<1, 0<e<1, for example, $LiNi_{0.5}Co_{0.2}Mn_{0.3}O_2$ (NCM523), $LiNi_{0.6}Co_{0.2}Mn_{0.2}O_2$(NCM622), etc.), lithium iron phosphate ($LiFePO_4$) (LFP), lithium cobalt phosphate (LCP), lithium titanate, lithium niobium tungstate, lithium nickel manganate, lithium titanium sulfide ($LiTiS_2$), or combinations thereof. In aspects, the cathode 104 can comprise a sodium-based electrode, for example, $NaVPO_4F$, $NaMnO_2$, $Na_{2/3}Mn_{1-y}Mg_yO_2$ (0<y<1), $Na_2Li_2Ti_5O_{12}$, $Na_2Ti_3O_7$, or combinations thereof. In aspects, the cathode 104 can comprise a magnesium-based electrode, for example, magnesiochromite ($MgCr_2O_4$), $MgMn_2O_4$, or combinations thereof. The cathode 104 can be a sintered electrode. Alternatively, the cathode 104 can be unsintered. An exemplary aspect of a cathode 104 is a NCM cathode.

As shown in FIGS. 1-2, the cathode 104 comprises a first major surface 105. In aspects, the cathode 104 can comprise a porosity, as measured at the first major surface 105, of about 2% or less, about 1.5% or less, or about 1% or less. In aspects, the cathode 104 can comprise a porosity, as measured at the first major surface 105, ranging from about 0.1% to about 2%, from about 0.2% to about 1.5%, from about 0.5% to about 1%, or any range or subrange therebetween. As used herein, porosity of a material is defined as a percentage of a volume of the coating occupied by voids (e.g., air, lack of material). Porosity of a material is calculated from an image taken at a major surface of the material using a scanning electron microscope (SEM), where the SEM image is analyzed using ImageJ with auto-thresholding to determine the fraction of the image corresponding to heights below the threshold. In aspects, the cathode 104 can comprise a closed pore structure. As used herein, a "close pore structure" means that there is no path from a pore at one major surface of the material to the opposite major surface of the material that can be accessed by fluid. Throughout the disclosure, whether a pore structure is open is determined in accordance with ASTM F3039-15 Method B. Providing a closed pore structure of the cathode can prevent the DES-based electrolyte from traveling beyond the cathode, which can increase a capacity retention of the solid-state battery and/or decrease an interfacial resistance after cycling. Providing a low (e.g., 2% or less, 1.5% or less, 1% or less) porosity at the first major surface of the cathode can reduce an amount of the DES-based electrolyte that can travel away from the interface between the cathode and the solid-state electrolyte, which can increase a capacity retention of the solid-state battery and/or decrease an interfacial resistance after cycling.

As shown in FIG. 1-2, the solid-state battery 101 or 201 comprises an interlayer 114 disposed on the first major surface 105 of the cathode 104. The interlayer 114 is positioned between the first major surface 105 of the cathode 104 and the solid-state electrolyte 108. The interlayer 114 comprises a deep-eutectic-solvent-based electrolyte. As used herein, a "deep eutectic solvent" (DES) is a binary or multivariate system comprising hydrogen bond donors and hydrogen bond acceptors. Due to the intermolecular hydrogen bonds between the hydrogen bond donors and hydrogen bond acceptors, a melting point of the DES decreases. Specifically, the melting point of the DES decreases below a melting point predicted from an ideal mixture of the components with the composition of the DES (e.g., for a binary mixture: y wt % component A*melting point of pure component A+z wt % component B*melting point of pure component B). The minimum melting point relative to the melting point of an ideal mixture of all compositions is a composition at the "eutectic point." The DES can comprise a melting point within about 10% or less, about 5 wt %, or 2 wt % or less of the melting point at the eutectic point. For example, the decreased melting point of the DES can enable the DES to be liquid state at room temperature. As used herein, room temperature is taken to be 25° C. As used herein, an "electrolyte" enables the transport of ions therein ("ion conductivity"), and the ion conductivity corresponds to an electrical conductivity of the electrolyte (e.g., DES-based electrolyte). DES-based electrolytes can have high ionic conductivity, low vapor pressure, low cost, non-flammability, and biodegradability. Providing a DES-based electrolyte can decrease an interfacial resistance between the cathode 104 and the solid-state electrolyte 108. Providing a liquid electrolyte between the cathode 104 and the solid-state electrolyte (e.g., wetting the cathode/SSE interface) can provide continuous and uniform ion paths at the interface and inside the cathode, for example, due to the high ionic conductivity of the liquid electrolyte and the ability of the liquid electrolyte to conform to the first major surface 105 of the cathode 104 and/or a surface of the solid-state electrolyte 108. Compared to ionic liquid electrolytes, DES-based electrolytes provide a lower-cost alternative that can be better suited for large-scale applications.

The DES-based electrolyte (e.g., interlayer 114) comprises a lithium salt and a sulfone compound. The lithium salt can be a hydrogen-bond acceptor in the DES-based electrolyte. As used herein, a "hydrogen bond acceptor" can accept an electron pair from a "hydrogen bond donor" to form an intermolecular interaction (e.g., hydrogen bond), for example, with an interaction energy of about 4 kJ/mol or more (e.g., from about 4 kJ/mol to about 17 kJ/mol). In aspects, the lithium salt can comprise lithium bis(trifluoromethanesulfonyl)imide (LiTFSI), lithium bis(fluorosulfonyl)imide (LiFSI), lithium perchlorate ($LiClO_4$), lithium tetrafluoroborate ($LiBF_4$), lithium triflate ($LiSO_3CF_3$), $LiC(SO_2CF_3)_3$, or combinations thereof. An exemplary aspect of the lithium salt includes a mixture of sulfolane and one or both of lithium bis(fluorosulfonyl)imide (LiFSI) or lithium perchlorate ($LiClO_4$). The sulfone compound can comprise a hydrogen bond donor in the DES-based electrolyte. As used herein, "sulfone" means that the sulfone compound includes a sulfur atom bonded to two oxygen atoms and two organic functional groups. In aspects, the sulfone compound can comprise sulfolane, 3-methylsulfolane, dimethyl sulfone, ethyl methyl sulfone, or combinations thereof. Sulfolane is also known as tetramethylene sulfone. As demonstrated in the Examples discussed below, the DES-based electrolyte of the present disclosure can enable reduced interfacial resistance (as-formed and after cycling—e.g., 15 $\Omega cm^2$ or less at room temperature after 10 cycles or more or 40 cycles or more) and/or increased capacity retention (e.g., about 90% or more after 40 cycles, about 80% or more after 100 cycles).

In aspects, a concentration of the lithium salt in the DES-based electrolyte can be about 0.5 molar (M) or more, about 0.75 M or more, about 1 M or more, about 2 M or more, about 5 M or less, about 4 M or less, or about 3 M or less. In aspects, a concentration of the lithium salt in the DES-based electrolyte can range from about 0.5 M to about 5 M, from about 0.75 M to about 4 M, from about 1 M to about 3 M, from about 2 M to about 3 M, or any range or subrange therebetween. In aspects, a ratio of a volume of the DES-based electrolyte (e.g., interlayer 114) in the solid-state battery 101 or 201 to an area of the first major surface 105 of cathode 104 can be about 1 $\mu L/cm^2$ or more, about 5 $\mu L/cm^2$ or more, about 10 $\mu L/cm^2$ or more, about 50 $\mu L/cm^2$ or less, about 30 $\mu L/cm^2$ or less, about 20 $\mu L/cm^2$ or less, or about 15 $\mu L/cm^2$ or less. In aspects, a ratio of a volume of the DES-based electrolyte (e.g., interlayer 114) in the solid-state battery 101 or 201 to an area of the first major surface 105 of cathode 104 can range from about 1 $\mu L/cm^2$ to about 50 $\mu L/cm^2$, from about 1 $\mu L/cm^2$ to about 30 $\mu L/cm^2$, from about 5 $\mu L/cm^2$ to about 20 $\mu L/cm^2$, from about 5 $\mu L/cm^2$ to about 15 $\mu L/cm^2$, from about 10 $\mu L/cm^2$ to about 15 $\mu L/cm^2$, or any range or subrange therebetween. Providing a concentration of the lithium salt within one or more of the above-mentioned ranges can enable good ionic conductivity of the DES-based electrolyte. Providing the ratio of the volume of the DES-based electrolyte to the area of the first major surface of the cathode can be sufficient to wet the interface between the cathode and the solid-state electrolyte while minimizing concerns associated with traditional liquid electrolytes (e.g., in liquid-based batteries or in hybrid liquid-solid batteries).

As shown in FIGS. 1-2, the solid-state battery 101 and 201 comprise a solid-state electrolyte 108 comprising a second major surface 107 facing the first major surface 105 of the cathode 104 with the interlayer 114 positioned therebetween. The solid-state electrolyte 108 can be disposed on the interlayer 114. Throughout the disclosure, "solid-state batteries" comprise a solid-state electrolyte. As used herein, a solid-state electrolyte is a material that is solid at room temperature and at an operating temperature (e.g., about 50° C.) of the solid-state battery. In aspects, the solid-state electrolyte 108 can comprise an inorganic solid-state electrolyte. Providing a solid-state electrolyte can address common safety concerns, for example, leakage, poor chemical stability, and flammability often seen in batteries employing liquid electrolytes. Moreover, providing a solid-state electrolyte can also suppress polysulfide shuttling from the cathode to the anode, thereby leading to improved cathode utilization and a high discharge capacity and energy density. Providing a solid-state electrolyte can reduce a formation of dendrites (e.g., lithium dendrites) that can otherwise result in failure of the battery.

In aspects, the solid-state electrolyte 108 can comprise lithium, lanthanum, zirconium, oxygen, or combinations thereof (e.g., each of lithium, lanthanum, zirconium, and oxygen—a LLZO compound). As used herein, "LLZO" refers to compounds including lithium, lanthanum, zirconium, and oxygen. In further aspects, the solid-state electrolyte 108 can comprise a lithium-garnet, for example, at least one of: (i) $Li_{7-3a}La_3Zr_2L_aO_{12}$, with L=Al, Ga or Fe and 0<a<0.33; (ii) $Li_7La_{3-b}Zr_2MbO_{12}$, with M=Bi or Y and 0<b<1; (iii) $Li_{7-c}La_3(Zr_{2-c},N_c)O_{12}$, with N=In, Si, Ge, Sn, V, W, Te, Nb, or Ta and 0<c<1; (iv) protonated LLZO (e.g., $H_xLi_{6.5-x}La_3Zr_{1.5}I_{0.5}O_{12}$, with I=In, Si, Ge, Sn, V, W, Te, Nb, or Ta and 0<x<4 or $H_xLi_{6.25-x}E_{0.25}La_3Zr_2O_{12}$, with E=Al, Ga or Fe and 0<x<4), or a combination thereof. In aspects, the solid-state electrolyte 108 can comprise at least one of $Li_{10}GeP_2Si_2$, $Li_{1.5}Al_{0.5}Ge_{1.5}(PO_4)_3$, $Li_{1.4}Al_{0.4}Ti_{1.6}(PO_4)_3$, $Li_{0.55}La_{0.35}TiO_3$, interpenetrating polymer networks of poly(ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed $Li_3PS_4$, $Li_6PS_5Cl$, or combinations thereof.

In aspects, the solid-state electrolyte 108 can comprise a porosity, as measured at the second major surface 107, of about 2% or less, about 1.5% or less, or about 1% or less. In aspects, the solid-state electrolyte 108 can comprise a porosity, as measured at the second major surface 107, ranging from about 0.1% to about 2%, from about 0.2% to about 1.5%, from about 0.5% to about 1%, or any range or subrange therebetween. In aspects, the solid-state electrolyte 108 can comprise a closed pore structure. Providing a closed pore structure of the solid-state electrolyte can prevent the DES-based electrolyte from traveling beyond the solid-state electrolyte and reduce the formation of dendrites (e.g., lithium dendrites), which can increase a capacity retention of the solid-state battery and/or decrease an interfacial resistance after cycling. Providing a low (e.g., 2% or less, 1.5% or less, 1% or less) porosity at the second major surface of the solid-state electrolyte can reduce an amount of the DES-based electrolyte that can travel away from the interface between the cathode and the solid-state electrolyte, which can increase a capacity retention of the solid-state battery and/or decrease an interfacial resistance after cycling.

In aspects, the first coating 106 can comprise a carbon-based interlayer (e.g., interlinked freestanding, micro/mesopore containing, functionalized, biomass-derived), a polymer-based interlayer, a metal-based coating (e.g., Ni foam, etc.), a liquid electrolyte (e.g., $LiPF_6$ in ethylene carbonate (EC)/dimethyl carbonate (DMC)), ionic liquid-based (e.g., $LiCF_3SO_3/CH_3CONH_2$, LiTFSI/N-methylacetamide (NMA), PEOisLiTFSI-10% $SiO_2$-10% IL, etc., where LiTFSI is bis(trifluoromethane) sulfonimide lithium salt ($LiN(CF_3SO_2)_2$), $SiO_2$ may be nanoparticles, and IL is an ionic liquid), or a combination thereof. Exemplary aspects of polymer-based interlayers include carbon polysulfides (CS), polyethylene oxides (PEO), polyaniline (PANI), polypyrrole (PPY), poly(3,4-ethylenedioxythiophene) (PEDOT), poly (styrene sulfonic acid) (PSS), polyacrylonitrile (PAN), polyacrylic acid (PAA), polyallylamine hydrochloride (PAH), poly(vinylidene fluoride-co-hexafluoropropylene) (P(VDF-co-HFP)), poly(methyl methacrylate) (PMMA), polyvinylidene fluoride (PVDF), poly(diallyldimethyl ammonium) bis(trifluoromethanesulfonyl)imide (TFSI) (PDDATFSI), or combinations thereof. In aspects, the first coating 106 can comprise at least one of, or at least two of, or at least three elements selected from a group consisting of nitrogen, carbon, cobalt, titanium, tantalum, and tungsten.

In aspects, the optional second interlayer or second coating 110 can comprise the materials or aspects discussed above the first coating 106 and/or the interlayer 114. In aspects, the optional second interlayer or second coating 110 can comprise an anode protector, for example, electrolyte additives (e.g., $LiNO_3$, lanthanum nitrate, copper acetate, $P_2S_5$, etc.), artificial interfacial layers (e.g., $Li_3N$, $(CH_3)_3SiCl$, $Al_2O_3$, LiAl, etc.), composite metallics (e.g., $Li_7B_6$, Li-rGO (reduced graphene oxide), layered Li-rGO, etc.), or combinations thereof. In aspects, the optional second interlayer or second coating 110 can comprise a thin layer of metal (e.g., Au) that may be ion-sputter coated to form a contact interface between the anode 112 the solid-state electrolyte 108 and another material of the optional second interlayer or second coating 110 or and another material of the optional second interlayer or second coating 110. In aspects, the optional second interlayer or second coating 110 can comprise a thin layer of silver (Ag) paste may be brushed on a surface of the solid-state electrolyte 108 (e.g., opposite the second major surface 107) to form a close contact between the anode 112 and solid-state electrolyte 108.

As shown in FIGS. 1-2, the anode 112 can be disposed on the solid-state electrolyte 108. The anode 112 comprises lithium. In aspects, the anode can comprise, consist essentially of, and/or consist of lithium (Li) metal.

FIG. 2 illustrates a solid-state battery with DES-based electrolyte at the cathode/solid-state electrolyte interface. As shown in FIG. 2, the solid-state battery 201 can comprise a coin-cell form, although the battery can comprise another form in other aspects. Compared to FIG. 1, FIG. 2 is a simplified solid-state battery 201 because the first coating 106 and the optional second interlayer or second coating 110 are omitted. Consequently, the interlayer 114 is in direct contact with the first major surface 105 of the cathode 104 and the second major surface 107 of the solid-state electrolyte 108. In aspects, as shown, the area of the first major surface 105 of the cathode 104 can be less than or equal to (e.g., less than) the area of the second major surface of the solid-state electrolyte 108. In aspects, the first current collector 102 and/or the second current collector 116 can comprise an outer surface of the solid-state battery 201. In further aspects, an electrically insulating layer 205*a* and 205*b* can be positioned between the first current collector 102 and the second current collector 116 to prevent a short circuit in the solid-state battery 201 and/or to form a barrier protecting the contents of the solid-state battery 201. As used herein, the electrically insulating layer 205*a* and 205*b* comprises an electronic conductivity of $10^{-5}$ S/cm or less. In even further aspects, as shown, the electrically insulating layer 205*a* and 205*b* can be configured to maintain a configuration of the solid-state battery 201, for example, by preventing the solid-state electrolyte 108 from contacting the second current collector 116. In further aspects, the electrically insulating layer 205*a* and 205*b* can comprise a polymeric material, for example, a fluoropolymer, a rubber, a polyurethane, or a silicone. In aspects, as shown, the solid-state battery 201 can further comprise an electrically conductive spacer 203 positioned between the anode 112 and the second current collector 116. In further aspects, the electrically conductive spacer 203 can comprise a foam (e.g., Ni foam), which can help maintain contact between adjacent components of the solid-state battery and/or control an amount of stress that the components of the solid-state battery are subjected to. Although not shown, an electrically conductive spacer can be positioned between the cathode and the first current collector.

Figure 6:
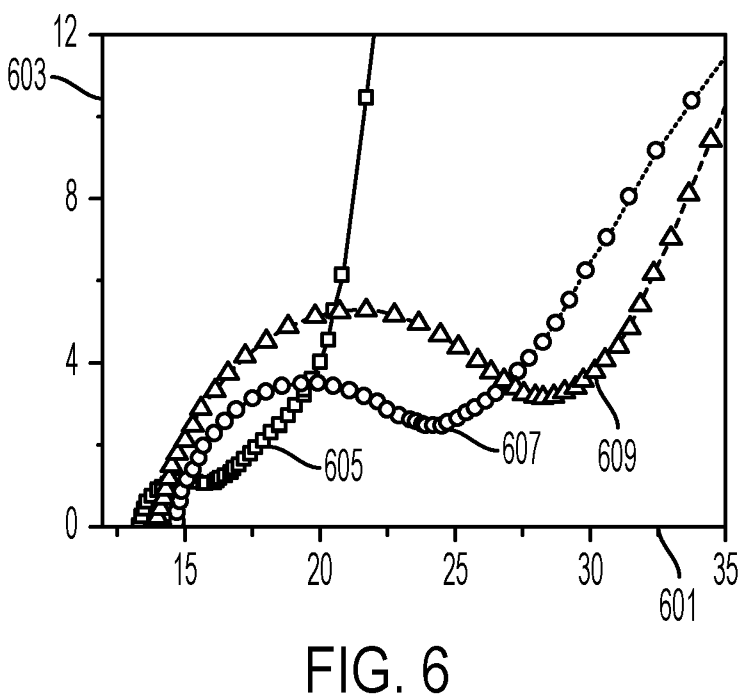
FIG. 6 illustrates Nyquist plots for Example 2.

FIG. 6 illustrates a Nyquist plot measured at 50° C., where the horizontal axis 601 corresponds to the real component of impedance (Z' measured in $\Omega cm^2$) and the vertical axis 603 corresponds to the negative imaginary component of impedance (Z" measured in $\Omega$ $cm^2$) for frequencies from 0.1 Hertz (Hz) to 1 MegaHertz (MHz) measured using Solartron 1260A impedance analyzer. Curves 605, 607, and 609 correspond to the performance of a solid-state battery in accordance with the aspects of the disclosure measured initially, after 11 cycles, and after 37 cycles, respectively. Unless otherwise indicated, a cycle corresponds to a charge-discharge cycle to a nominal capacity of 1 $mAh/cm^2$ with a charging current density of 0.5 $mA/cm^2$ and a discharge current density of 0.5 $mA/cm^2$ (corresponding to 0.5 C) while the solid-state battery is maintained at 50° C. Curves 607 and 609 have a well-defined arc (e.g., semi-circular) portion. Throughout the disclosure, "interfacial resistance" is defined as the difference between the real components of the impedance for the end-points of the arc shape in impedance results (i.e., Nyquist plot), where the higher end-point is taken as an inflection point in the impedance results. For example, the interfacial resistance of curve 609 is 15 $\Omega cm^2$. In aspects, after 10 cycles (to a nominal capacity of 1 $mAh/cm^2$ with a charging current density of 0.5 $mA/cm^2$ and a discharge current density of 0.5 $mA/cm^2$ while the solid-state battery is maintained at 50° C.), the interfacial resistance can be about 15 $\Omega cm^2$ or less, about 12 $\Omega cm^2$ or less, or about 10 $\Omega cm^2$ or less at room temperature. In aspects, after 40 cycles (to a nominal capacity of 1 $mAh/cm^2$ with a charging current density of 0.5 $mA/cm^2$ and a discharge current density of 0.5 $mA/cm^2$ while the solid-state battery is maintained at 50° C.), the interfacial resistance can be about 15 $\Omega cm^2$ or less, about 12 $\Omega cm^2$ or less, or about 10 $\Omega cm^2$ or less at room temperature. Maintaining a low (e.g., about 15 $\Omega cm^2$ or less, about 12 $\Omega cm^2$ or less, or about 10 $\Omega cm^2$ or less) interfacial resistance can enable the solid-state battery to have a longer life (e.g., withstand more cycles without failure), reduce losses and heating from increased interfacial resistance, and/or reduce the formation of dendrites (e.g., lithium dendrites) that can lead to failure of the solid-state battery.

Throughout the disclosure, capacity retention refers to the percent of an original capacity that the solid-state battery can achieve after a predetermined cycle using the same charge-discharge cycle for all cycles. In aspects, after 40 cycles or more (to a nominal capacity of 1 $mAh/cm^2$ with a charging current density of 0.5 $mA/cm^2$ and a discharge current density of 0.5 $mA/cm^2$ while the solid-state battery is maintained at 50° C.), the solid-state battery can exhibit a capacity retention of about 80% or more, about 90% or more, or about 95% or more. In aspects, after 100 cycles or more (to a nominal capacity of 1 $mAh/cm^2$ with a charging current density of 0.5 $mA/cm^2$ and a discharge current density of 0.5 $mA/cm^2$ while the solid-state battery is maintained at 50° C.), the solid-state battery can exhibit a capacity retention of about 80% or more, about 90% or more, or about 95% or more. Maintaining a high capacity retention (e.g., 90% or more after 40 cycles or more, 80% or more after 100 cycles or more) can enable the solid-state battery to be functional for an intended use for a longer period of time than would otherwise be possible.

Figures 8, 9:
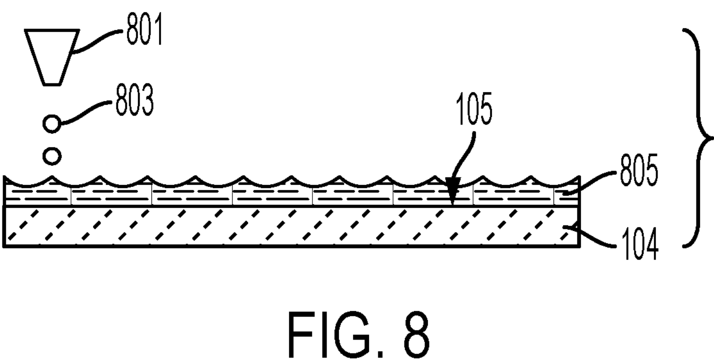
FIG. 8 illustrates a step in an exemplary method comprising disposing a DES-based electrolyte on a cathode.
FIG. 9 illustrates a step in an exemplary method comprising disposing a solid-state electrolyte on the DES-based electrolyte.

Aspects of methods of making the solid-state battery in accordance with aspects of the disclosure will be discussed with reference to example method steps illustrated in FIGS. 8-9. In aspects, as shown in FIG. 8, methods can comprise disposing a deep-eutectic solvent-based electrolyte 803 comprising the lithium salt and the sulfone compound on the first major surface 105 of the cathode 104. The cathode 104 can comprise any of the aspects discussed above for the cathode 104. The DES-based electrolyte can comprise any of the aspects discussed above for the interlayer 114. In further aspects, as shown, disposing the DES-based electrolyte 803 can comprise dispensing a predetermined amount of the DES-based electrolyte 803 from a container 801 (e.g., conduit, flexible tube, micropipette, or syringe) to form a layer 805 on the first major surface 105 of the cathode 104. In further aspects, the predetermined amount of the DES-based electrolyte as a ratio of a volume of the DES-based electrolyte to an area of the first major surface can be about 1 $\mu L/cm^2$ or more, about 5 $\mu L/cm^2$ or more, about 10 $\mu L/cm^2$ or more, about 50 $\mu L/cm^2$ or less, about 30 $\mu L/cm^2$ or less, about 20 $\mu L/cm^2$ or less, or about 15 $\mu L/cm^2$ or less. In further aspects, the predetermined amount of the DES-based electrolyte as a ratio of a volume of the DES-based electrolyte to an area of the first major surface can range from about 1 $\mu L/cm^2$ to about 50 $\mu L/cm^2$, from about 1 $\mu L/cm^2$ to about 30 $\mu L/cm^2$, from about 5 $\mu L/cm^2$ to about 20 $\mu L/cm^2$, from about 5 $\mu L/cm^2$ to about 15 $\mu L/cm^2$, from about 10 $\mu L/cm^2$ to about 15 $\mu L/cm^2$, or any range or subrange therebetween. Providing the ratio of the volume of the DES-based electrolyte to the area of the first major surface of the cathode can be sufficient to wet the interface between the cathode and the solid-state electrolyte while minimizing concerns associated with traditional liquid electrolytes (e.g., in liquid-based batteries or in hybrid liquid-solid batteries). Although not shown, the cathode can be disposed on the first current collector while the DES-based electrolyte is disposed on the cathode.

In aspects, as shown in FIG. 9, methods can proceed to disposing the solid-state electrolyte 108 over the first major surface 105 of the cathode 104, as indicated by arrow 901. The solid-state electrolyte 108 can comprise any of the aspects discussed above for the solid-state electrolyte 108. In further aspects, as shown, the second major surface 107 of the solid-state electrolyte 108 can face the first major surface 105 of the cathode 104 with the layer 805 positioned therebetween. Disposing the solid-state electrolyte 108 over the first major surface 105 of the cathode 104 can form the layer 805 into the interlayer 114 shown in FIGS. 1-2. As shown, the anode 112 can be disposed on the solid-state electrolyte 108 while the solid-state electrolyte 108 is disposed over the first major surface 105 of the cathode 104. Although not shown, the anode could be disposed on the solid-state electrolyte after the solid-state electrolyte is disposed on the cathode. Although not shown, it is to be understood that elements (e.g., second current collector, optional second interlayer or coating, electrically conductive spacer) can be disposed on the solid-state electrolyte opposite the second major surface while the solid-state electrolyte is disposed over the first major surface of the cathode. Alternatively, the anode can be disposed on the solid-state electrolyte after the solid-state electrolyte is disposed over the cathode. Although not shown, before disposing a surface the solid-state electrolyte over the cathode, the solid-state electrolyte can be cleaned by treating the surface of the solid-state electrolyte with an acid (e.g., HCl), for example, to remove an insulating and/or resistive surface layer that could impair the resulting interfacial resistance and performance of the resulting solid-state battery.

Although not shown, it is to be understood that methods of making the solid-state battery can comprise (1) disposing the DES-based electrolyte comprising the lithium salt and the sulfone compound on the second major surface of the solid-state electrolyte and (2) disposing the cathode (e.g., first major surface) over the second major surface of the solid-state electrolyte. However, when the area of the first major surface is less than an area of the second major surface, more of the DES-based electrolyte is at the interface when the DES-based electrolyte is disposed on the cathode instead of the solid-state electrolyte.

EXAMPLES

Various aspects will be further clarified by the following examples. Examples (Ex) 1-3 and Comparative Examples (CE) 1-2 comprise NCM523 cathode with a diameter of 12 mm, a lithium garnet (discussed below) solid-state electrolyte with a diameter of 14 mm and a thickness of 0.6 mm, the anode comprised lithium metal foil comprising a diameter of 12 mm and a thickness of 0.3 mm. NCM523 refers to $LiNi_{0.5}Co_{0.2}Mn_{0.3}O_2$ (precursor commercially available from Landt Instruments), which was formed into slurry with a 8:1:1 weight ratio of the precursor, super P carbon black (available from Timcal-Imerys), and poly(vinylidene fluoride) (PVDF) (dissolved in N-methylpyrrolidone) that was coated on aluminum (Al) foil with a predetermined thickness and dried under vacuum. Examples 1-3 and Comparative Examples 1-2 were processed in accordance with the methods discussed above with reference to FIGS. 8-9 to form a battery resembling the solid-state battery 201 shown in FIG. 2 in a CR2025 coin cell form with Ni foam disposed on the anode.

The lithium garnet solid-state electrolyte was cubic phase $Li_{6.5}La_3Zr_{1.4}Ta_{0.5}O_{12}$ (LLZTO), which was synthesized from a stoichiometric ratio of starting powders of $LiOH \cdot H_2O$ (AR), $La_2O_3$ (99.99%), $ZrO_2$ (AR), $Ta_2O_5$ (99.99%). 2 wt % excess of $LiOH \cdot H_2O$ added to compensate the lithium loss during processing. $La_2O_3$ was heated at 900° C. for 12 hours to remove any moisture and/or $CO_2$. The raw materials were mixed via a wet grinding process in which yttrium stabilized zirconium oxide (YSZ) balls and isopropanol (IPA) were used as the milling media. The mixture was dried and calcined at 950° C. for 6 hours in an alumina crucible to obtain pure cubic garnet phase powder. These powders were pressed into green pellets and sintered at 1230° C. for 1 hour, covered with LLZTO powder with 15 wt % Li excess in platinum crucibles.

Before assembly, the lithium garnet solid-state electrolyte sheets were dry polished followed by immersing in 1 mol/L HCl solution (in ethanol) for 10 minutes. After that, in an argon-filled glovebox, fresh Li foils were directly attached and pressed onto one side of the lithium garnet solid-state electrolyte. Then, the lithium garnet solid-state electrolyte and Li foil was heated at 340° C. for 5 minutes, followed by naturally cooling to room temperature (e.g., 25° C.). The liquid electrolyte stated in Table 1 was prepared by mixing the stated components until dissolved, and 10 $\mu L/cm^2$ was disposed on the cathode, and then the exposed surface of the lithium garnet solid-state electrolyte (opposite the lithium anode) was placed on the liquid electrolyte wetted cathode. The Ni foam with the same diameter as Li anode was placed on the top of anode, and the battery was sealed in a CR2025 coin cell with an applied pressure of 5 MPa.

As shown in Table 1, Examples 1-3 comprised a DES-based electrolyte of a lithium salt and sulfolane. LiFSI means lithium bis(fluorosulfonyl)imide. Comparative Example 1 comprises a lithium salt in propylene carbonate. Comparative Example 2 comprises a lithium salt in an equal volume mixture of ethylene carbonate and dimethyl carbonate.

TABLE 1

Properties of Examples 1-3 and Comparative Examples 1-2

| Example | Lithium Salt | Solvent | Charge Current Density ($mA/cm^2$) | Discharge Current Density ($mA/cm^2$) | Capacity ($mAh/cm^2$) | Temperature (° C.) |
|---|---|---|---|---|---|---|
| Ex. 1 | 3M LiFSI | Sulfolane | 2 | 1 | 1 | 60 |
| Ex. 2 | 1M $LiClO_4$ | Sulfolane | 2 | 1 | 1 | 60 |
| Ex. 3 | 1M $LiClO_4$ | Sulfolane | 0.5 | 0.5 | 1 | 50 |
| CE 1 | 1M $LiClO_4$ | Propylene Carbonate | 0.5 | 0.5 | 1 | 50 |
| CE 2 | 1M $LiPF_6$ | Ethylene Carbonate + Dimethyl Carbonate | 0.5 | 0.5 | 1 | 50 |

Figure 3:
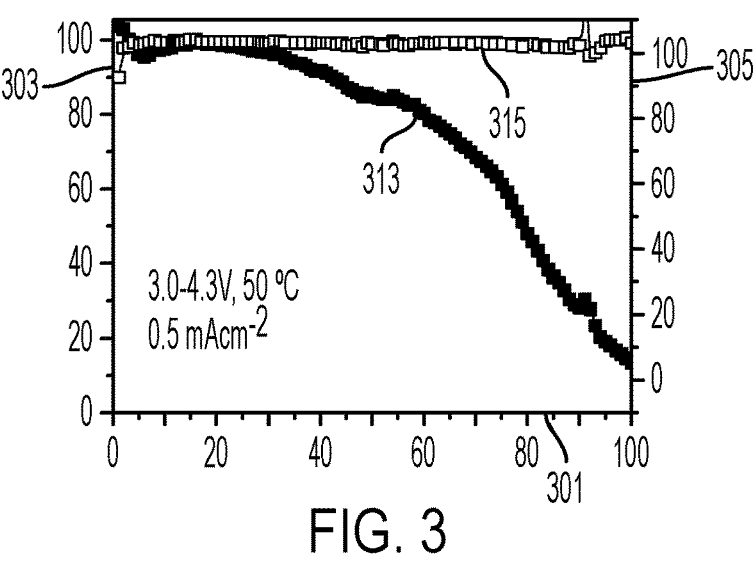
FIG. 3 illustrates capacity retention and Columbic efficiency for Comparative Example 2.

Examples 1-3 and Comparative Examples 1-2 were tested with the cycle conditions stated in Table 1 using a CT2001A Battery Test System (Landt). FIG. 3 presents the capacity retention and Columbic efficiency of Comparative Example 2 over 100 cycles. In FIG. 3, the horizontal axis 301 is number of cycles, the left vertical axis 303 is capacity retention %, and the right vertical axis 305 is Columbic efficiency. Curve 315 represents the Columbic efficiency of Comparative Example 2, which is about 90% or more for all cycles shown. Curve 313 represents the capacity retention of Comparative Example 3. As shown, by 40 cycles, the capacity retention is less than 90%; by 60 cycles, the capacity retention is less than 80%; and by 100 cycles, the capacity retention is less than 20%. Consequently, a battery can have good Columbic efficiency while still having problems with capacity retention.

Figure 4:
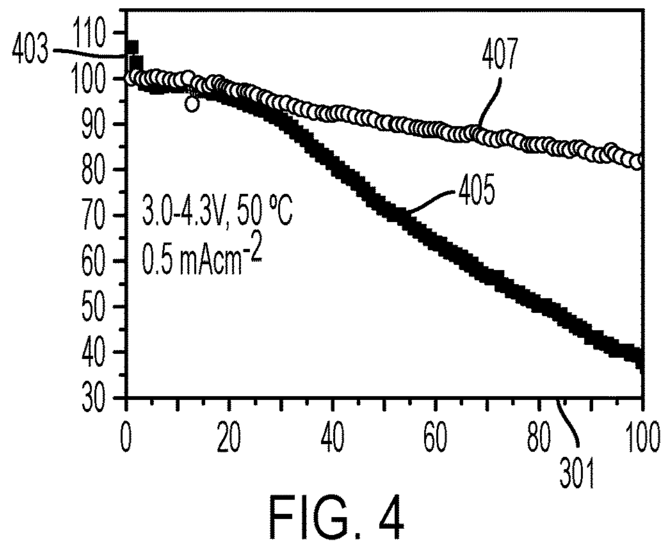
FIG. 4 illustrates capacity retention for Example 3 and Comparative Example 1.

FIG. 4 presents the capacity retention of Example 3 and Comparative Example 1. In FIG. 4, the horizontal axis 301 is the number of cycles, and the vertical axis 403 is capacity retention %. Curve 407 represents the capacity retention of Example 3, and curve 405 represents the capacity retention of Comparative Example 1. For curve 405 (Comparative Example 1), by 40 cycles, the capacity retention is less than 80%; and by 100 cycles, the capacity retention is about 40%. In contrast, for curve 407 (Example 3), at 40 cycles, the capacity retention is greater than 90% (e.g., about 95%); and at 100 cycles, the capacity retention is greater than 80%. Since Example 3 and Comparative Example 1 comprise the same lithium salt in the same concentration, Example 3 provides an unexpected benefit of increased capacity retention by using a DES-based electrolyte comprising a lithium salt and a sulfone compound (sulfolane).

Figure 5:
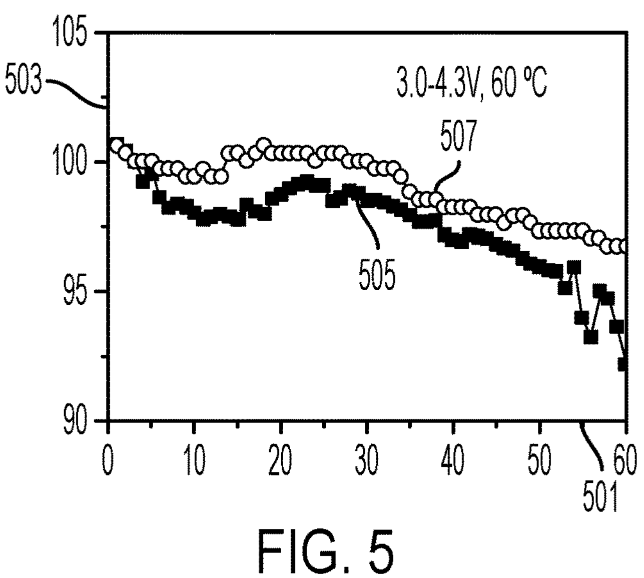
FIG. 5 illustrates capacity retention for Example 1 and Example 2.

FIG. 5 presents the capacity retention of Example 1 and Example 2. In FIG. 5, the horizontal axis 301 is the number of cycles, and the vertical axis 503 is capacity retention %. Curve 507 represents the capacity retention of Example 1. Curve 505 represents the capacity retention of Example 2. As shown, both curves 505 and 507 (Example 1 and Example 2) comprise a capacity retention of greater than 80% (e.g., greater than 90%, greater than 95%, and about 97.5% or more) at 40 cycles; at 60 cycles, both curves 505 and 507 (Example 1 and Example 2) comprise a capacity retention greater than 80% (e.g., greater than 90%, and about 92% or more). At Example 2, curve 507 (Example 1) has a capacity retention of greater than 90% (e.g., greater than 95%, about 97% or more). For the increased charging current density and discharge current density of Examples 1-2 compared to Comparative Examples 1-2, it would be expected that capacity retention would decrease for Examples 1-2 because using increased current densities generates more stress in the battery during cycling. Instead, Example 1-2 unexpectedly have increased capacity retention compared to Comparative Examples 1-2.

As discussed above in discussing interfacial resistance, FIG. 6 show Nyquist plots. In FIG. 6, curves 605, 607, and 609 correspond to Example 2 as-formed (no cycles), after 11 cycles, and after 37 cycles, respectively. As shown, the interfacial increases as the number of cycles increase. This data is represented as curve 707 of FIG. 7.

Figure 7:
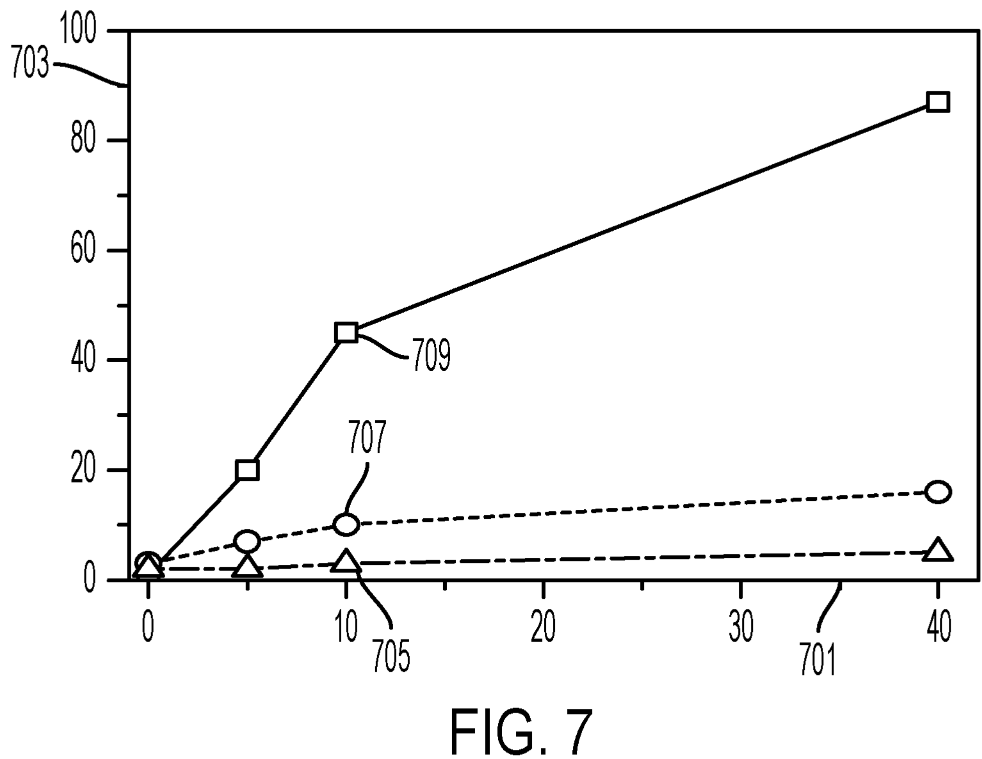
FIG. 7 illustrates changes in interfacial resistance for Example 1, Example 2, and Comparative Example 2.

FIG. 7 shows interfacial resistance in $\Omega cm^2$ on the vertical axis 703 versus cycle number on the horizontal axis 701. Curve 705 corresponds to Example 1, curve 707 corresponds to Example 2, and curve 709 corresponds to Comparative Example 2. For curve 709 (Comparative Example 2), the interfacial resistance is about 20 $\Omega cm^2$ or more after 5 cycles, and greater than 40 $\Omega cm^2$ after 10 cycles. Curves 705 and 707 (Example 1 and Example 2) comprise an interfacial resistance of 20 $\Omega cm^2$ or less (e.g., about 15 $\Omega cm^2$ or less, and about 10 $\Omega cm^2$ or less) at 10 cycles. Curves 705 and 707 (Example 1 and Example 2) comprise an interfacial resistance of 20 $\Omega cm^2$ or less (e.g., about 15 $\Omega cm^2$ or less) at 40 cycles. Compared to Comparative Example 3, Examples 1-2 demonstrate an unexpected benefit in increased interfacial resistance (e.g., after 10 cycles or more, about 40 cycles or more).

The above observations can be combined to provide batteries and methods of making the same comprising a deep-eutectic-solvent-based electrolyte (DES) between (e.g., at an interface) a cathode and a solid-state electrolyte. Providing the DES-based electrolyte can decrease an interfacial resistance between the cathode and a solid-state electrolyte. Providing a liquid electrolyte between the cathode and the solid-state electrolyte (e.g., wetting the cathode/SSE interface) can provide continuous and uniform ion paths at the interface and inside the cathode, for example, due to the high ionic conductivity of the liquid electrolyte and the ability of the liquid electrolyte to conform to the first major surface of the cathode and/or a surface of the solid-state electrolyte. Compared to ionic liquid electrolytes, DES-based electrolytes provide a lower-cost alternative that can be better suited for large-scale applications.

The DES-based electrolyte comprises a lithium salt and a sulfone compound. Providing a concentration of the lithium salt from about 0.5 M to about 5 M (e.g., from 1 M to about 3 M) can enable good ionic conductivity of the DES-based electrolyte. Providing the ratio of the volume of the DES-based electrolyte to the area of the first major surface of the cathode from about 1 μL/cm2 to about 50 $\mu L/cm^2$ (e.g., from about 5 $\mu L/cm^2$ to about 20 $\mu L/cm^2$) can be sufficient to wet the interface between the cathode and the solid-state electrolyte while minimizing concerns associated with traditional liquid electrolytes (e.g., in liquid-based batteries or in hybrid liquid-solid batteries). As demonstrated in the Examples discussed below, the DES-based electrolytes of the present disclosure can unexpectedly enable reduced interfacial resistance (as-formed and after cycling—e.g., 15 $\Omega cm^2$ or less at room temperature after 40 cycles) and/or increased capacity retention (e.g., about 95% or more after 40 cycles, about 95% or more after 100 cycles). Maintaining a low (e.g., about 15 $\Omega cm^2$ or less, about 12 $\Omega cm^2$ or less, or about 10 $\Omega cm^2$ or less) interfacial resistance can enable the solid-state battery to have a longer life (e.g., withstand more cycles without failure), reduce losses and heating from increased interfacial resistance, and/or reduce the formation of dendrites (e.g., lithium dendrites) that can lead to failure of the solid-state battery. Maintaining a high capacity retention (e.g., 95% or more after 40 cycles or more, 95% or more after 100 cycles or more) can enable the solid-state battery to be functional for an intended use for a longer period of time than would otherwise be possible.

Providing a solid-state electrolyte can address common safety concerns, for example, leakage, poor chemical stability, and flammability often seen in batteries employing liquid electrolytes. Moreover, providing a solid-state electrolyte can also suppress polysulfide shuttling from the cathode to the anode, thereby leading to improved cathode utilization and a high discharge capacity and energy density. Providing a solid-state electrolyte can reduce a formation of dendrites (e.g., lithium dendrites) that can otherwise result in failure of the battery. Providing a closed pore structure of the solid-state electrolyte can prevent the DES-based electrolyte from traveling beyond the solid-state electrolyte and reduce the formation of dendrites (e.g., lithium dendrites), which can increase a capacity retention of the solid-state battery and/or decrease an interfacial resistance after cycling. Providing a low (e.g., 2% or less, 1.5% or less, 1% or less) porosity at the second major surface of the solid-state electrolyte can reduce an amount of the DES-based electrolyte that can travel away from the interface between the cathode and the solid-state electrolyte, which can increase a capacity retention of the solid-state battery and/or decrease an interfacial resistance after cycling.

Providing a closed pore structure of the cathode can prevent the DES-based electrolyte from traveling beyond the cathode, which can increase a capacity retention of the solid-state battery and/or decrease an interfacial resistance after cycling. Providing a low (e.g., 2% or less, 1.5% or less, 10% or less) porosity at the first major surface of the cathode can reduce an amount of the DES-based electrolyte that can travel away from the interface between the cathode and the solid-state electrolyte, which can increase a capacity retention of the solid-state battery and/or decrease an interfacial resistance after cycling. Providing an electrically conductive spacer (e.g., comprising a foam, for example, Ni foam) can help maintain contact between adjacent components of the solid-state battery and/or control an amount of stress that the components of the solid-state battery are subjected to.

Directional terms as used herein—for example, up, down, right, left, front, back, top, bottom—are made only with reference to the figures as drawn and are not intended to imply absolute orientation.

It will be appreciated that the various disclosed aspects may involve features, elements, or steps that are described in connection with that aspect. It will also be appreciated that a feature, element, or step, although described in relation to one aspect, may be interchanged or combined with alternate aspects in various non-illustrated combinations or permutations.

It is also to be understood that, as used herein the terms "the," "a," or "an," mean "at least one," and should not be limited to "only one" unless explicitly indicated to the contrary. For example, reference to "a component" comprises aspects having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, aspects include from the one particular value and/or to the other particular value. Similarly, when values are expressed as approximations, by use of the antecedent "about," it will be understood that the particular value forms another aspect. Whether or not a numerical value or endpoint of a range in the specification recites "about," the numerical value or endpoint of a range is intended to include two aspects: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In aspects, "substantially similar" may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

While various features, elements, or steps of particular aspects may be disclosed using the transitional phrase "comprising," it is to be understood that alternative aspects, including those that may be described using the transitional phrases "consisting of" or "consisting essentially of," are implied. Thus, for example, implied alternative aspects to an apparatus that comprises A+B+C include aspects where an apparatus consists of A+B+C and aspects where an apparatus consists essentially of A+B+C. As used herein, the terms "comprising" and "including", and variations thereof shall be construed as synonymous and open-ended unless otherwise indicated.

The above aspects, and the features of those aspects, are exemplary and can be provided alone or in any combination with any one or more features of other aspects provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the aspects herein provided they come within the scope of the appended claims and their equivalents.

What is claimed is:

1. A battery, comprising:

a cathode;

an interlayer disposed on a first major surface of the cathode, the interlayer comprising a deep-eutectic-solvent-based electrolyte comprising a lithium salt and a sulfone compound;

a solid-state electrolyte disposed on the interlayer; and a lithium anode disposed on the solid-state electrolyte.

2. The battery of claim 1, wherein the lithium salt comprises at least one of: lithium bis(trifluoromethanesulfonyl) imide (LiTFSI), lithium bis(fluorosulfonyl)imide (LiFSI), lithium perchlorate ($LiClO_4$), lithium tetrafluoroborate ($LiBF_4$), lithium triflate ($LiSO_3CF_3$), $LiC(SO_2CF_3)_3$, or combinations thereof.

3. The battery of claim 1, wherein the sulfone compound comprises at least one of: sulfolane, 3-methylsulfolane, dimethyl sulfone, ethyl methyl sulfone.

4. The battery of claim 1, wherein a concentration of the lithium salt in the sulfone compound is from 0.5 molar to 5 molar.

5. The battery of claim 4, wherein the concentration of the lithium salt in the sulfone compound is from 1 molar to 3 molar.

6. The battery of claim 1, wherein the deep-eutectic-solvent-based electrolyte comprises sulfolane and one or both of lithium bis(fluorosulfonyl)imide (LiFSI) or lithium perchlorate ($LiClO_4$).

7. The battery of claim 1, wherein a ratio of a volume of the deep-eutectic-solvent-based electrolyte to an area of the first major surface of the cathode from about 1 $\mu L/cm^2$ to about 50 $\mu L/cm^2$.

8. The battery of claim 7, wherein the ratio of the volume of the deep-eutectic-solvent-based electrolyte to the area of the first major surface of the cathode is from about 5 $\mu L/cm^2$ to about 20 $\mu L/cm^2$.

9. The battery of claim 1, wherein the cathode comprises a porosity of 2% or less or a closed pore structure.

10. The battery of claim 1, wherein the solid-state electrolyte comprises a porosity of 2% or less or a closed pore structure.

11. The battery of claim 1, wherein the cathode comprises at least one of lithium cobaltite (LCO), lithium manganite spinel (LMO), lithium nickel cobalt aluminate (NCA), lithium nickel manganese cobalt oxide (NCM) ($LiNi_dCo_eMn_{1-d-e}O_2$, where 0<d<1, 0<e<1), lithium iron phosphate ($LiFePO_4$) (LFP), lithium cobalt phosphate (LCP), lithium titanate, lithium niobium tungstate, lithium nickel manganate, and lithium titanium sulfide ($LiTiS_2$), or combinations thereof.

12. The battery of claim 1, wherein the solid-state electrolyte comprises lithium, lanthanum, zirconium, and oxygen.

13. The battery of claim 12, wherein the solid-state electrolyte comprises at least one of:

(i) $Li_{7-3a}La_3Zr_2L_aO_{12}$, with L=Al, Ga, or Fe and 0<a<0.33;

(ii) $Li_7La_{3-b}Zr_2M_bO_{12}$, with M=Bi or Y and 0<b<1;

(iii) $Li_{7-c}La_3(Zr_{2-c},N_c)O_{12}$, with N=In, Si, Ge, Sn, V, W, Te, Nb, or Ta and 0<c<1;

(iv) protonated LLZO (e.g., $H_xLi_{65-x}La_3Zr_{1.5}I_{0.5}O_{12}$, with I=In, Si, Ge, Sn, V, W, Te, Nb, or Ta and 0<x<4 or $H_xLi_{6.25-x}E_{0.25}La_3Zr_2O_{12}$, with E=Al, Ga, or Fe and 0<x<4); or a combination thereof.

14. The battery of claim 1, wherein the battery has an interfacial resistance between the cathode and the solid-state electrolyte of about 15 $\Omega cm^2$ or less at room temperature after 10 cycles.

15. The battery of claim 1, wherein the battery has an interfacial resistance between the cathode and the solid-state electrolyte of about 15 $\Omega cm^2$ or less at room temperature after 40 cycles.

16. The battery of claim 1, wherein the battery comprises a capacity retention of about 90% or more after 40 cycles.

17. The battery of claim 1, wherein the battery comprises a capacity retention of about 80% or more after 100 cycles.

18. A method of forming a battery comprising:

disposing a deep-eutectic-solvent-based electrolyte comprising a lithium salt and a sulfone compound on a first major surface of a cathode; and disposing a solid-state electrolyte over the first major surface of the cathode, the deep-eutectic-solvent-based electrolyte positioned between the cathode and the solid-state electrolyte.

19. The method of claim 18, further comprising disposing an anode on the solid-state electrolyte, the solid-state electrolyte positioned between the cathode and the anode.

20. The method of claim 18, wherein:

a concentration of the lithium salt in the sulfone compound is from 0.5 molar to 5 molar;

a ratio of a volume of the deep-eutectic-solvent-based electrolyte to an area of the first major surface of the cathode from about 1 $\mu L/cm^2$ to about 50 $\mu L/cm^2$;

the deep-eutectic-solvent-based electrolyte comprises sulfolane and one or both of lithium bis(fluorosulfonyl) imide (LiFSI) or lithium perchlorate ($LiClO_4$); or any combination thereof.

* * * * *